April 25, 1961 W. M. CARTER ET AL 2,981,147
APPARATUS FOR FORMING CONTOUR LINES
Filed June 2, 1955 2 Sheets-Sheet 1
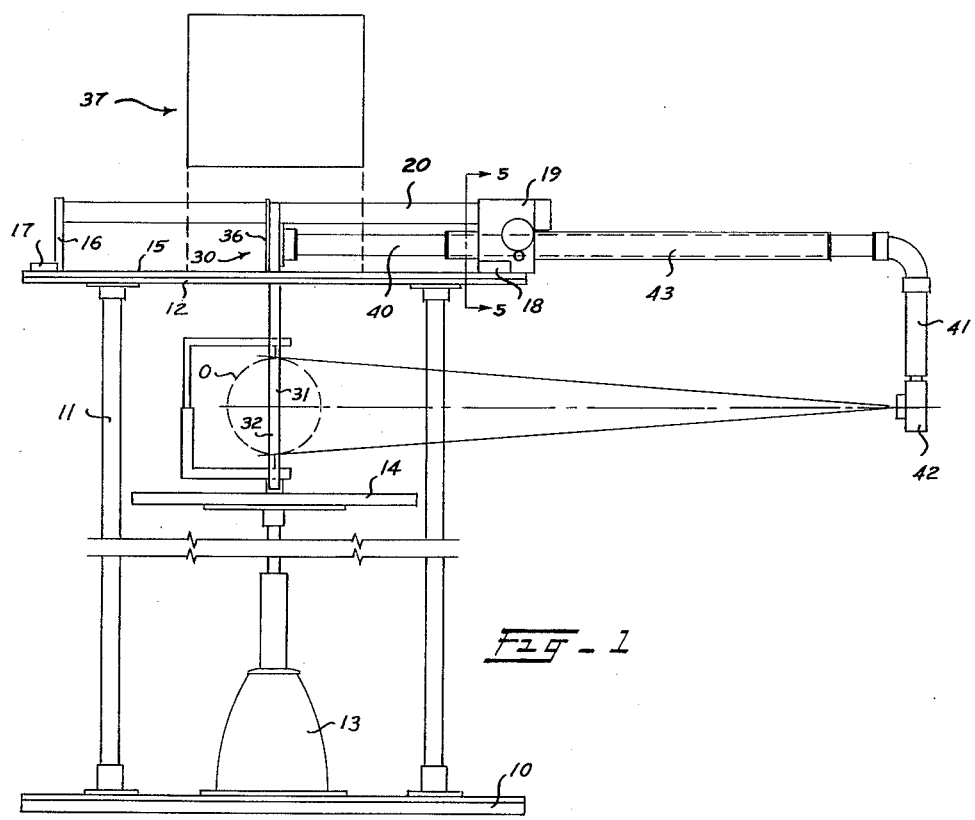
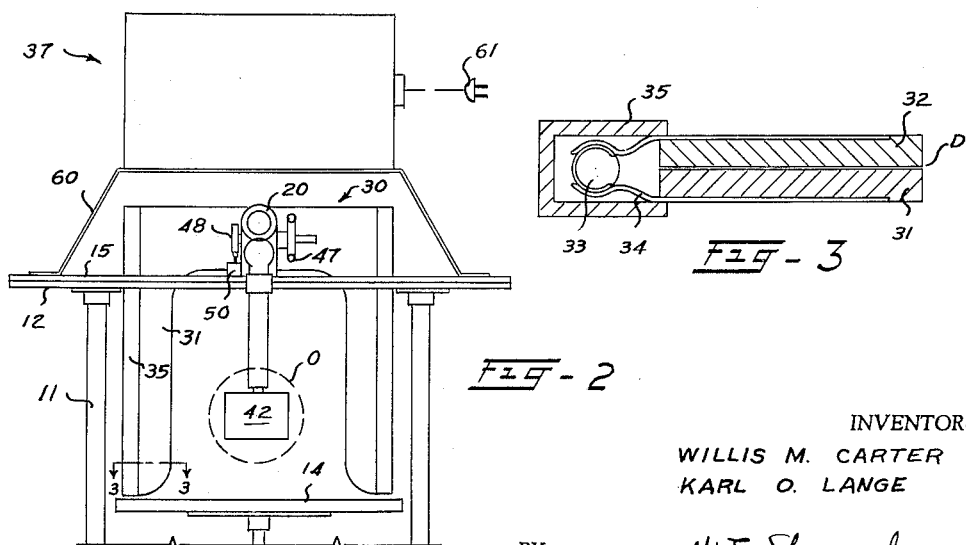
INVENTORS
WILLIS M. CARTER
KARL O. LANGE
BY W. E. Sherwood
ATTORNEY

INVENTORS
WILLIS M. CARTER
KARL O. LANGE

BY W.E. Sherwood
ATTORNEY

United States Patent Office 2,981,147
Patented Apr. 25, 1961

2,981,147

APPARATUS FOR FORMING CONTOUR LINES

Willis M. Carter and Karl O. Lange, Lexington, Ky., assignors to Lange Instrument Company, Lexington, Ky., a corporation of Kentucky Filed June 2, 1955, Ser. No. 512,783

5 Claims. (Cl. 88—24)

This invention relates generally to an improved method and apparatus for forming contour lines upon the surface of a three dimensional object or area by the use of a sheet of light. In a more limited aspect it relates to the production of a record of such contours. Such records may be employed for diverse purposes, as, for example, measurement of length and areas along and between the contour or contours; comparative measurement against each other; or comparative measurement against the recorded contours of a standard object or area.

In constrast with the relatively complex mechanical contouring methods and devices, the present invention provides a rapid and inexpensive solution to the problem of contouring of irregular shapes such as surfaces of shoe lasts, crash helments, fillets, propeller blades, air foils, and othe inanimate objects. Moreover, due to the rapidity with which the process may be employed it is especially useful in contouring animate objects such, for example, as in observing and recording the configuration of the surfaces of parts of the human body. In particular, it may be used in connection with anatomical, pathological, physiological and anthropological measurements.

Furthermore, the invention permits the forming of a distinct, preferably transitory, contour image upon an object whose surface is in its normal condition and without requiring pretreatment with special light reflecting materials.

As used herein, the term "transitory" signifies a temporary state in contrast to a state of permanence. Whereas the taking of a photograph or other record of the transitory image results in a permanent record, the visual inspection of the image while the light is projected on the object is considered transistory regardless of how long such light may be projected. It is contemplated that the light source may at times be so rapidly actuated as to cause the eye to view the image as though the light were uninterrupted. Such an image, however, is regarded as being transitory within the meaning of our disclosure.

Various methods have been proposed or employed heretofore for forming a contour on the surface of an object by the use of light, which contour may then be directed upon a viewing screen. However, to the best of our knowledge these prior methods have possessed one or more of the disadvantages of: weak or diffused contour lines necessitating the coating of the object with light reflecting material; requiring lenses in the light path due to the nature of the light source or collimating means being used; possessing stringent limitations as to the size of object which can be processed particularly as to its location with respect to the light source; limiting the operations to use in a dark environment; or precluding the photographing of contour lines without unduly long exposure times.

Accordingly, one object of our invention is to provide a new and improved method and apparatus for forming a sharply defined contour line of light upon a three dimensional object or area.

A second object is to provide a method and apparatus for rapidly scanning the surface of a three dimensional object or area by forming a plurality of chronologically and physically spaced contour lines of light thereon.

A third object is to provide a method and apparatus adapted for measuring the surface of a three dimensional object or area by forming a record, or records, of successive individual contour lines or of a plurality of chronologically and physically spaced contour lines thereon and wherein the plane of each line may be spaced from the plane of an adjacent line by a predetermined distance.

A fourth object is to provide an improved method and apparatus for recording the appearance of the surface of a three dimensional object of area by reference to contour lines thereon.

Another object is to provide an improved apparatus for photographing the contour lines of a three dimensional object or area.

Other objects and advantages will become apparent when the following description is considered in conjunction with the accompanying drawings in which:

Fig. 1 is a side elevation view of one form of apparatus suitable for carrying out the method of the invention;

Fig. 2 is an end elevation of a portion of the apparatus of Fig. 1;

Fig. 3 is a sectional view taken on line 3—3 of Fig. 2;

Figure 5:
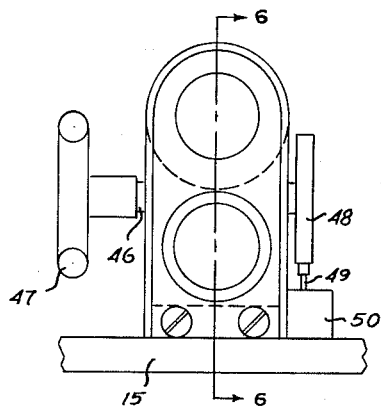
Fig. 5 is a view taken on line 5—5 of Fig. 1 and showing one form of control mechanism.

As will be noted from the following description the invention is capable of manifold uses and adaptations. Not only may the invention be used for recording the contours of an object but it may be used equally well for mere transitory visual observation of the object. It may be used for observing of recording only a single contour at a given plane of the object, or may be used for scanning the object through a series of planes along one axis, and with such planes being displaced uniformly or non-uniformly from each other. Likewise, the observation, recording or scanning may be employed along different axes, with either or both the object or the sheet of light being rotated or translated along the several axes.

Therefore, we do not limit our invention in any way to the precise structure as illustrated but on the contrary intend that all matter contained in the following description or shown in the accompanying drawings shall be interpreted as illustrative and not in a limiting sense.

Referring now to Fig. 1, a stationary base plate 10 upon which a plurality of upright members 11 are mounted, may be used to support a stationary top annular plate or ring 12 and to form a framework for supporting the movable portions of the apparatus. When desired, a light shield or curtain, not shown, may be suitably arranged upon the framework partially to enclose the object being observed.

Centrally mounted within said framework is an elevator mechanism 13, such as a hydraulic lift, carrying a plate 14 upon which any suitable means for mounting the object may be placed. For example, the object mounting means may comprise a rigid holder for holding an inanimate object; may comprise a chair in which an animate object may be seated; or may comprise a movable carriage in which the object under observation may rest for movement past the scanning means later to be described. Moreover, the elevator mechanism may provide for rotational movement of the object as well as for lifting and lowering movement of the same.

Disposed above annular ring 12 is a second annular ring 15 adapted to rotate in a horizontal plane and engaging with the stationary ring by means of a suitable guiding structure, not shown. Adjacent its periphery is an upstanding end plate 16 suitably fastened to the rotatable ring by an angle block 17. Diametrically disposed upon the rotatable ring is a control box structure shown in Figs. 5 and 6 and having a bottom member 18 affixed to the ring and a top member 19 for receiving one end of a tube or rod 20. This rod is fixedly secured at its other end in the plate 16 and provides a simple guide structure along which the light slit assembly 30 may readily be moved.

As shown in Figs. 1 to 3, the slit assembly preferably includes a pair of bifurcated parallel plates 31 and 32, having a width substantially in excess of their thickness, and with the plates partially or wholly encircling the object O, and transversely separated by a small slit aperture D. In one satisfactory usage of the invention, separation of about .010 inch provides a sufficiently thin sheet of collimated light to give well defined, sharp contours without fuzziness or dispersion. An elongated stroboscopic type gas discharge tube or tubes 33 preferably is used in our apparatus, although in its broader aspects any suitable source of intense light may be employed without departing from the spirit of the invention. As noted in Fig. 3 the tube 33 is mounted and electrically connected with its metal terminals by means of suitable metal clamps 34, embedded in Bakelite or equivalent insulating material. These clamps may be mounted upon the spaced plates 31 and 32 at suitable locations adjacent the ends of the tube 33, similar to the mounting of conventional elongated fuses and the like. The tube accordingly may be easily removed from the clamps for replacement purposes. Preferably the tube is partially enclosed by a removable light shield or reflector 35 so that all emitted light leaving the assembly passes through the slit indicated at D.

As a result of the arrangement providing a relatively long path of travel of light from the tube to the outer edge of plates 31 and 32 through the very narrow slit, a good collimation of light rays results. A thin sheet of light, therefore, can be projected for a substantial distance before striking the object to be intersected, and without undue diffusion. By employing a source of intense light in combination with this slit assembly a sharply defined contour line is formed upon the object even when such object is spaced from the light source at distances which were impractical in prior apparatus.

Affixed to the rear of plate 32 adjacent its top is a backing plate 36 of Bakelite or equivalent insulating material to which electrical connections may be made from the power supply generally indicated at 37, and from which suitable leads, not shown, may be led to the tube clamps. The entire slit assembly is adapted to move as a unit along guide rod 20 and for this purpose is rigidly fixed to an elongated actuating tube or rod 40. At its extreme outer end the actuating tube 40 is provided with a depending tubular connection 41, to which a camera 42 or other visual recording or viewing means may be attached at a location appropriate for viewing the object O.

Figure 6:
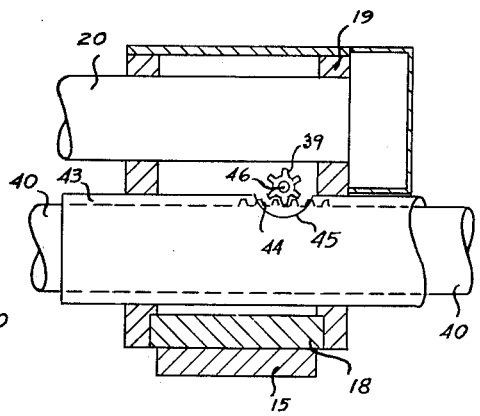
Fig. 6 is a view partly in section taken on line 6—6 of Fig. 5.

As best shown in Fig. 6, the actuating tube is supported within hollow sleeve 43 for a substantial portion of its length and this sleeve in turn is mounted within the control box. Along its upper surface the tube is provided with axially arranged threads, forming a rack 44 equivalent in length to the required displacement of the camera and the slit assembly, with respect to the object under observation. Sleeve 43 is cut away at 45 to provide space for a pinion 39 on the shaft 46, which shaft may be actuated manually or automatically by means of a driving wheel 47 attached to one end of the shaft. At its opposite end the shaft may support a suitable timing disc 48 adapted to cooperate through a spring loaded detent arrangement 49 with a timing control mechanism 50. This mechanism of conventional nature may, for example include one or more microswitches, which in addition to being automatically operated by the driving wheel 47 may be capable of hand operation or may be actuated by a suitabe push button arrangement, should such alternative actuation be desired. The timing mechanism in any event is connected by suitable leads, not shown, to either or both the camera and the power supply for the lights. Such leads may conveniently be led through the hollow tube 40 with allowance for relative travel of the structure, or alternately may be swung outwardly of said tube.

As will thus be apparent to those skilled in the art, at least four possible operational arrangements for carrying out our method are available to the operator. Firstly, the lead from mechanism 50 to camera 42 may be for shutter operation of the camera or for both shutter operation and film advance, while the connection to the power supply for the lights may be made thereto from the flash light synchro-switch of such camera. In this case the light projection is triggered in synchronism with the shutter movement.

Secondly, when using a camera without a synchroswitch the leads may be arranged so that control mechanism 50 simultaneously operates the camera shutter and the power supply for the lights, but without a direct connection between the camera and the power supply.

Thirdly, the camera shutter may be kept open for the duration of a contouring operation and the lead from the control mechanism may be used only to operate the power supply for the lights at different planes of the object under observation.

Fourthly, the control mechanism may be used to operate the camera shutter and to operate the power supply for the lights in such a manner that the lights remain on indefinitely, or operate so frequently that a visual image of the contour appears to be uninterrupted. When using the stroboscopic light, preferred in our combination of structure, this effect may be secured by repeated discharges of the power supply condenser at its high cyclic rate.

When carrying out any of the foregoing, or other arrangements for forming contours by our invention, and involving the mechanical operation of shaft 46, pinion 39 and disc 48 for actuating the control mechanism 50, it will be noted that both a chronological and a physical displacement of successive contour lines is achieved. By substituting one disc 48 of a different configuration for another such disc, a variation of such displacements can easily be secured.

While our invention in its broader aspects is suitable for use with any light source of reasonable light intensity, we prefer to employ a source which will not require a precoating of the object under observation. Such a pretreatment with conventional materials, for example, magnesium oxide powder, is especially undesirable when contouring animate objects. Accordingly, we prefer to use a power supply 37 and light tube 33 giving an intense light preferably of short time duration and preferably capable of a relatively high cyclic rate. We have found that a stroboscopic light fulfills this requirement under certain conditions.

For example, a commercially available power supply of Strobo Research, Inc. having about 10 watts seconds per flash intensity and a repetition rate of more than 10 per second; or the Animation power supply of the American Speed-light Corporation having about 50 watt seconds per flash intensity may be employed in conjunction with suitable commercially available gas filled light tubes adapted for high voltage electrical discharge therethrough.

As is known, such tubes for stroboscopic lighting are often concentrated into or disposed close to the focal point of a parabolic reflector. Since we desire to provide the maximum amount of available light energy in the collimated sheet of light emerging through slit D between plates 31 and 32, the tube 33 accordingly is mounted to direct its light beam in the plane of slit D, as seen in Fig. 3.

Figure 4:
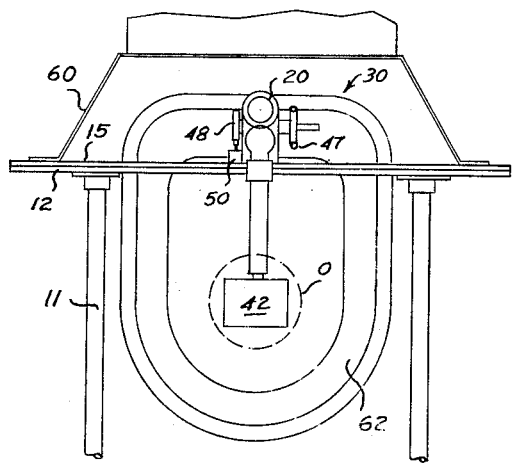
Fig. 4 is a view similar to Fig. 2 and showing a modified form of light projector.

We have obtained excellent results with straight tubes of ¼" diameter and about 18" in length when using a slit assembly 30 in the arrangement shown in Figs. 2 and 3. Other shapes of tubes such as indicated in the arcuate light projecting means 62 of Fig. 4, and other ranges of light intensities may be employed as desired. Depending upon the nature of observation desired of object O, the sheet of light may be projected so as to form the illuminated contour image completely around the object or along only a portion of its surface. In general, the power supply 37 has a very small discharge time in the order of about 20 micro seconds. Also, in general, when employing a camera in recording the contours and when using the light intensities above mentioned, a diaphragm opening of about f : 5.6 is satisfactory.

In scanning an object O by appropriate movement of handwheel 47, we have easily been able to produce ten contours per second upon various objects under observation. The power supply 37 may conveniently be mounted upon a frame member 60 attached to the upper ring 15 for rotation therewith, sufficient slack being provided in the power lead 61 leading to the source in order to accommodate rotation of the assembly. Usually, such rotation is limited to 360°. Suitable extensible leads, not shown, extend from the power supply to plate 36 on which electrical connections are mounted. The plate rotates as a unit with the power supply, but may have a translatory movement with respect thereto.

While we have described one arrangement of structure for carrying out the invention and by means of which the light scanning or observing structure is moved past or around the object under observation, it will be obvious to those skilled in the art that the light slits may be held stationary and the object moved past or rotated within such stationary slits or that both of these alternative movements may be employed in connection with the described apparatus, by employing a rotatable and a horizontally translatable support plate 14. All such modifications within the skill of the art are comprehended within our invention.

With the apparatus as shown, the method may be practiced in alternate ways as now to be described. Firstly, as an essential feature of assuring uniform scale dimensions of the contour or contours, a fixed distance is maintained at all times between the plane of the sheet of light projected from the slit means and the lens of the camera. Since it is the contour which is important, rather than the photograph of the object as a whole, the change in photographed size of the object between the one extreme setting of rod 40 and the other extreme setting is immaterial. In general, when superimposing a plurality of contours upon the same section of film with an open shutter, we prefer to photograph the object in at least semi-darkness to avoid forming a blurred image of the object as a whole upon the film, although this is not essential. We may also employ a camera 42 having a conventional shutter and film moving mechanism or may employ a motion picture camera. Any of such cameras may also be used with an open shutter. Furthermore, when observation only, rather than recording of the contours, is desired, the observer's eye may be placed at the position normally occupied by the camera lens, or a movable viewing screen may be employed at such position.

Figure 7:
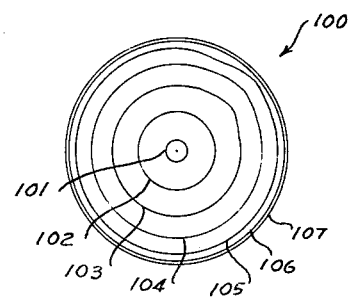
Fig. 7 is a view showing the contour lines of a convex shaped object as recorded by the method and apparatus of the invention.

Assuming, as a simple illustration, that it is desired to inspect a normally spherical object, such as the baseball 100 shown in Fig. 7, the object is mounted upon plate 14 and the rod 40 may be moved to the right in Fig. 1 until the plane of light will intersect the object at somewhat less than a tangential plane. At this time operation of the preset control box mechanism causes the stroboscope power supply 37 to fire tube 33. The sheet of light, therefore, intersects the object along its surface, giving a thin sharply defined contour line represented on a photograph by line 101. Thereupon rod 40 is moved to the left of Fig. 1 a predetermined distance and the next contour line 102 is established, followed in turn by lines 103 to 107. As noted from Fig. 7, lines 103, 104 and 105 show a marked deviation from the other lines, thus indicating that the object is not entirely spherical. As will be apparent, by employing a suitable scale, or by comparison with a predetermined standard, the degree of such variation may be measured.

Moreover, line 107 may be taken so as to show the maximum contour of the object and thus may serve as a useful measuring reference. After taking the series of contours along one axis of the object, the object may remain fixed upon support plate 14 and the apparatus turned to another axis by means of rotation of the ring 15. Thereupon, a second series of contours may be taken in a similar manner. Preferably the control box is adapted to function as the rod 40 moves in either direction so that the contours may be taken either from the maximum contour to the minimum contour, or in the opposite sequence.

As above mentioned, it is immaterial as to whether the image of the object as a whole is recorded. Each contour being recorded is a true representation of the contour of a particular section of the object and the relation of the sequence of contours to each other provides the information desired by the observer regardless of whether the whole object is seen. In contouring irregularly shaped subjects, as for example the human head, the distance between successive contour lines may provide useful information as to the shape of the body, as for example, cheek bones, forehead and the like. For prescribing head gear, such as crash helmets, this method of measuring and fitting by contouring is of distinct value. Moreover, due to the rapidity with which such measurements may be taken by our contouring arrangement, as contrasted with mechanical measuring, the person under observation is not required to undergo a laborious and annoying examination. In addition, the necessity for pretreatment by light reflecting coating is obviated with corresponding advantage.

Having thus described our invention and having illustrated one preferred apparatus for carrying out the same, it is not intended to limit the scope of the invention thereto. On the contrary, such variations as may be employed by those skilled in this art are intended to be included in the scope of the following claims.

We claim:
1. In an apparatus for forming and recording the configuration of a closed contour line of the surface of a three-dimensional object, the combination comprising, means for supporting said object with the portion of its surface to be inspected in visible relation to a camera, a light-projecting assembly disposed adjacent and on opposite sides of said supported object and adapted to direct a sheet of collimated light against the surface of said object thereby to form a closed contour line of said surface at the intersection of said sheet of light with said surface, said assembly including a pair of bifurcated parallel opaque plates spaced from each other and having a slit of substantially uniform thickness therebetween, said slit extending from a first edge of said plates confronting said object to a second edge of said plates disposed a sufficient distance from said first edge to effect a collimation of light rays passing through said slit and with said second edge at a greater distance from said object than said first edge, a stroboscope light tube disposed in said assembly outwardly of said second edge of said plates and adapted to direct light into said slit for collimation upon passage along said slit, a power supply for intermittently actuating said tube, a camera spaced from the plane of said sheet of light and with the focal axis of said camera being substantially perpendicular to the plane of said sheet of light, said camera being adapted for recording the contour line produced upon said object, and means for actuating said power supply to cause an electrical discharge through said tube.

2. Apparatus as defined in claim 1 wherein the thickness of said slit is about 0.010 inch.

3. Apparatus as defined in claim 1 wherein said electrical discharge from said power supply has a duration of not more than about one-tenth of a second and has a flash intensity of not less than about ten watt-seconds.

4. In an apparatus for forming and recording the configuration of a series of closed contour lines of the surface of a three-dimensional object, the combination comprising, means for supporting said object with the portion of its surface to be inspected in visible relation to a camera, a light-projecting assembly disposed adjacent and on opposite sides of said supported object and adapted to direct a sheet of colimated light against the surface of said object thereby to form a closed contour line of said surface at the intersection of said sheet of light with said surface, said assembly including a pair of bifurcated parallel opaque plates spaced from each other and having a slit of substantially uniform thickness therebetween, said slit extending from a first edge of said plates confronting said object to a second edge of said plates disposed at a sufficient distance from said first edge to effect a collimation of light rays passing through said slit and with said second edge at a greater distance from said object than said first edge, means for mounting said assembly, said means for supporting said object and said means for mounting said assembly being adapted for relative movement with respect to each other and along an axis perpendicular to the plane of said sheet of light, a stroboscope light tube disposed in said assembly outwardly of said second edge of said plates and adapted to direct light into said slit for collimation upon passage along said slit, a power supply for intermittently actuating said tube, a camera disposed at a fixed distance from the plane of said sheet of light for recording to a uniform scale each contour line produced by said sheet upon said object, means for effecting said relative movement between said object and said assembly during the interval between the formation of consecutive contour lines, and means for actuating said power supply to cause an electrical discharge through said tube.

5. Apparatus as defined in claim 4 wherein said means for actuating said power supply includes a timing means having connections to said power supply and to said camera for synchronizing the operations of said camera and tube.

References Cited in the file of this patent
UNITED STATES PATENTS

| | | |
|---|---|---|
| 1,546,636 | Engelmann | July 21, 1925 |
| 1,719,483 | Morioka | July 2, 1929 |
| 2,163,124 | Jeffreys et al. | June 20, 1939 |
| 2,163,125 | Jeffreys et al. | June 20, 1939 |
| 2,244,687 | Goldsmith et al. | June 10, 1941 |
| 2,350,796 | Morioka | June 6, 1944 |
| 2,703,755 | Webb et al. | Mar. 8, 195' |